US010324532B2

(12) United States Patent
Le Rouzo et al.

(10) Patent No.: US 10,324,532 B2
(45) Date of Patent: Jun. 18, 2019

(54) DEVICE ESPECIALLY FOR A DISPLAY FOR VISUALLY IMPAIRED PEOPLE AND DISPLAY COMPRISING SUCH A DEVICE

(71) Applicant: INSIDE VISION, Grigny (FR)

(72) Inventors: Denis Le Rouzo, Paris (FR); Damien Mauduit, Saint Genevieve des Bois (FR)

(73) Assignee: Inside Vision, Grigny (FR)

( * ) Notice: Subject to any disclaimer, the term of this patent is extended or adjusted under 35 U.S.C. 154(b) by 262 days.

(21) Appl. No.: 15/504,828

(22) PCT Filed: Aug. 12, 2015

(86) PCT No.: PCT/FR2015/000175
§ 371 (c)(1),
(2) Date: Feb. 17, 2017

(87) PCT Pub. No.: WO2016/027011
PCT Pub. Date: Feb. 25, 2016

(65) Prior Publication Data
US 2017/0242489 A1    Aug. 24, 2017

(30) Foreign Application Priority Data
Aug. 18, 2014    (FR) ..................................... 14 01870

(51) Int. Cl.
*G06F 3/14*    (2006.01)
*G06F 3/01*    (2006.01)
(Continued)

(52) U.S. Cl.
CPC ............ *G06F 3/016* (2013.01); *G06F 3/0485* (2013.01); *G06F 3/04817* (2013.01);
(Continued)

(58) Field of Classification Search
CPC ....................................................... G06F 3/14
(Continued)

(56) References Cited

U.S. PATENT DOCUMENTS 6,489,951 B1    12/2002  Wong et al.
9,430,954 B1 *   8/2016  Dewhurst ............ G09B 21/007
(Continued)

FOREIGN PATENT DOCUMENTS

| EP | 0 874 345 A1 | 10/1998 |
| EP | 2 211 325 A1 | 7/2010 |
| FR | 2 955 689 A1 | 7/2011 |
| WO | 98/26583 A1 | 6/1998 |
| WO | 2012/170745 A2 | 12/2012 |

OTHER PUBLICATIONS

International Search Report issued in PCT/FR2015/000175; dated Nov. 30, 2015.

*Primary Examiner* — Ruay Ho
(74) *Attorney, Agent, or Firm* — Studebaker & Brackett PC

(57) ABSTRACT

Device especially for a display for visually impaired people and display including such a device. The device includes a tactile screen, especially for a display for visually impaired people, said screen including, on one of the edges thereof, a line of icons that each correspond to a piece of software. The surface of the said tactile screen is divided at least into as many columns as icons, and the device includes an element for determining the position of the finger of a user on said tactile screen in order to control the implementation of the software corresponding to the determined position of the user's finger.

10 Claims, 1 Drawing Sheet

(51) Int. Cl.
  *G09B 21/02* (2006.01)
  *G06F 3/0488* (2013.01)
  *G09B 21/00* (2006.01)
  *G06F 3/0481* (2013.01)
  *G06F 3/0485* (2013.01)
  *G06F 3/16* (2006.01)

(52) U.S. Cl.
  CPC .......... *G06F 3/04886* (2013.01); *G06F 3/167* (2013.01); *G09B 21/003* (2013.01); *G09B 21/005* (2013.01); *G09B 21/007* (2013.01); *G09B 21/008* (2013.01); *G09B 21/025* (2013.01); *G06F 2203/04809* (2013.01)

(58) Field of Classification Search
  USPC .......................... 715/702; 345/163, 168, 173
  See application file for complete search history.

(56) References Cited

U.S. PATENT DOCUMENTS

| | | |
|---|---|---|
| 2008/0068343 A1 | 3/2008 | Hoshino et al. |
| 2010/0134416 A1* | 6/2010 | Karasin .................. G06F 3/016 345/163 |
| 2010/0309147 A1* | 12/2010 | Fleizach ............. G06F 3/04883 345/173 |
| 2011/0179388 A1 | 7/2011 | Fleizach et al. |
| 2011/0234502 A1* | 9/2011 | Yun ........................ G06F 3/016 345/173 |
| 2013/0016042 A1* | 1/2013 | Makinen ................ G06F 3/016 345/168 |
| 2013/0249821 A1 | 9/2013 | Dharmaraja et al. |
| 2013/0328809 A1 | 12/2013 | Smith |

* cited by examiner

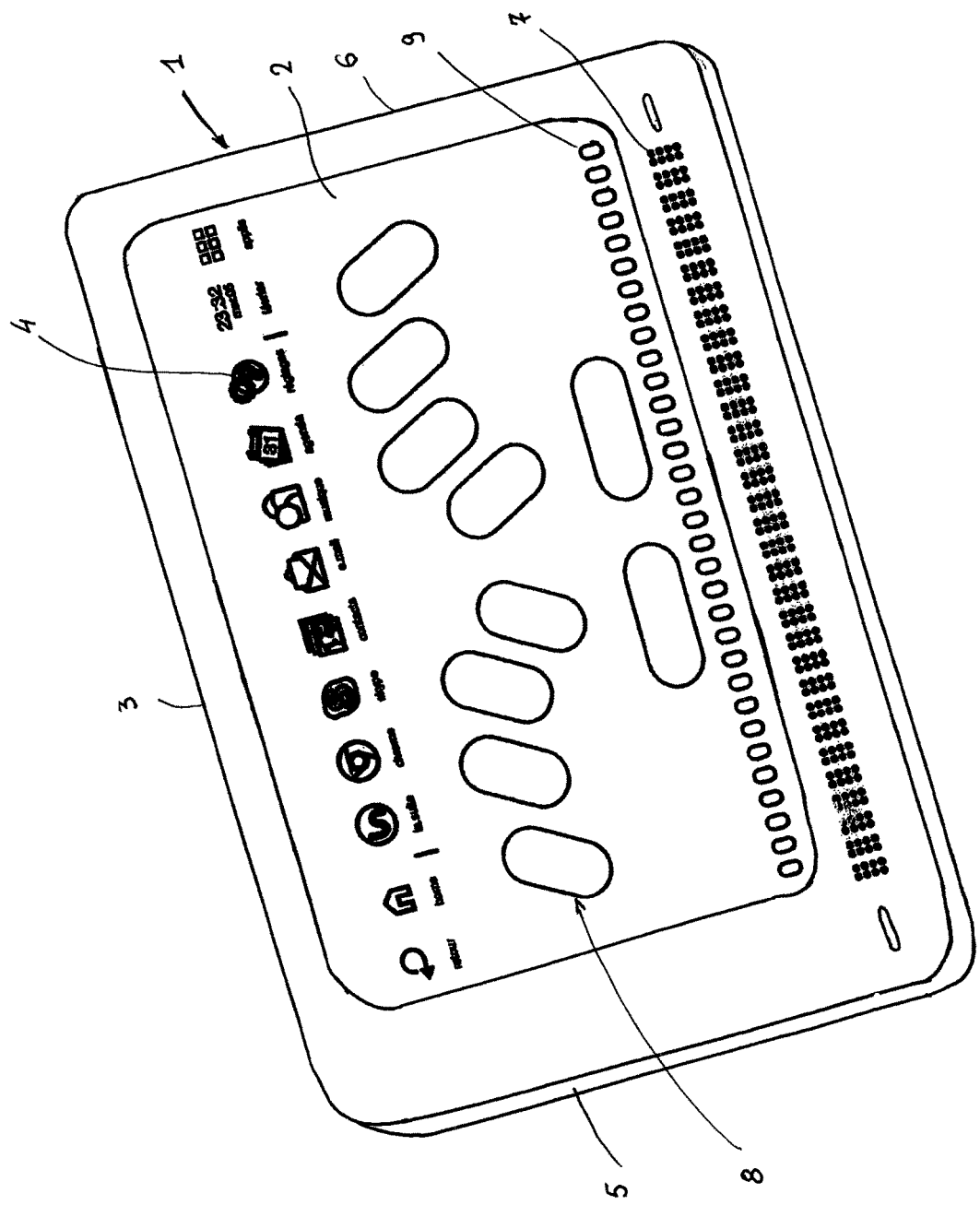

DEVICE ESPECIALLY FOR A DISPLAY FOR VISUALLY IMPAIRED PEOPLE AND DISPLAY COMPRISING SUCH A DEVICE

The present invention relates to a device especially for a display for visually impaired people, and to a display comprising such a device.

It should be noted that a visually impaired person is a person whose visual acuity of the better eye, after correction and at 5 meter, is less than or equal to $3/10^e$. The present invention relates to all of these people, but also to people who are unable to see, who see nothing and who are blind, these two groups of people being referred to indifferently hereinafter by the term "visually impaired people".

Currently, visually impaired people use braille displays, which comprise braille cells disposed side-by-side so as to form a reading range, and control buttons for activating navigation controls for navigating through a text, as well as a braille keyboard.

Such braille displays are currently proposed with and without the possibility for connection to a computer screen. The devices described especially in documents US-2008/068343-A, WO-98/26583-A, EP-874345-A and FR-2955689-A are cited by way of example.

All of these devices from the prior art or currently marketed have the sole function of making it possible to type and read a text.

Due to development in the field of IT, numerous pieces of software have appeared, which cannot be used by these braille displays.

One of the aims of the present invention is also to provide a device especially for a display for visually impaired people so as to allow said people to choose and to use different pieces of software.

Another aim of the invention is to provide such devices which can be easily and quickly implemented by visually impaired people.

An additional aim of the invention is to provide a display comprising such a device.

These and also further aims, which will become clear hereinafter, are achieved by a device comprising a tactile screen, especially for a display for visually impaired people, characterised in that said tactile screen comprises imprints corresponding to the fingers (these being spaced apart) of the right and left hands of a user.

The tactile screen advantageously comprises, along one of the edges thereof, a line of icons that each correspond to a piece of software.

The tactile screen is preferably divided at least into as many columns as icons, and said device comprises means for determining the position of the finger of a user in the imprints of the tactile screen.

The tactile screen advantageously comprises a "next" column in order to scroll through the icons.

The tactile screen advantageously comprises a "previous" column in order to scroll through the icons.

The device preferably also comprises a voice emitter making it possible to identify each icon determined by the position of the user's finger.

The device advantageously also comprises a braille display making it possible to identify each icon determined by the position of the user's finger.

The tactile screen advantageously comprises imprints corresponding to "routine cursors".

The tactile screen is preferably gridded, at least in the zone of these imprints.

The present invention also relates to a display for visually impaired people comprising a device as described above.

The following description, which is in no way limiting, relates to an embodiment of the present invention and must be read with reference to the sole accompanying drawing, which is a perspective view of a device in accordance with the present invention.

In order to give a direction to the terms upper, lower, right and left, it will be considered that these indications are given on the basis of a user facing the shown device.

As can be seen in this drawing, a device in accordance with the present invention is formed of a tactile screen 2 forming the upper face of a display, denoted in its entirety by the reference 1, intended in the present case for visually impaired people. The display 1 and the tactile screen 2 are rectangular in shape.

In accordance with the present exemplary embodiment, a line of icons 4 is disposed on one of the edges of the tactile screen, in the present case a longitudinal edge, such as the upper longitudinal edge 3: this tactile screen 2 is divided into at least as many columns as icons. In addition, a first end column forms the equivalent of a "previous" button and a second end column forms the equivalent of a "next" button. Usually, the first column is situated close to the left side edge 5 of the tactile screen 2, and the second column is situated close to the right side edge 6 of this same tactile screen 2, when the user is facing this tactile screen.

This device also comprises means for determining the position of a user's finger on the tactile screen 2. These means are known: they make it possible to determine the surface of the finger in a column and therefore to activate the icon corresponding to the column covered by the greatest surface of the finger compared to the adjacent column.

These determination means are coupled to a voice emitter and/or a braille display 7 stating and/or making it possible to read the name of the software associated with the identified icon as described above. The braille display is, in this exemplary embodiment, situated close to the lower edge of the tactile screen 2.

Such a device therefore enables a visually impaired person to choose a specific piece of software, for example by sliding his finger over said tactile screen 2, which allows said person to hear the names of the pieces of software and/or to read these on the braille display 7 and to choose the desired one by holding his finger on the column corresponding to the icon for which he hears and/or reads the name.

In accordance with a preferred embodiment of the present invention the tactile screen 2 also comprises imprints 8 corresponding to the spaced-apart fingers of both hands: the user is thus guided in order to place his fingers so as to be able to write in braille. Nevertheless, this tactile screen 2 can comprise a grid pattern, more especially at these imprints 8, in conjunction with means for determining the position of the finger controlling the braille characters.

The term imprint denotes an indented mark corresponding substantially to the end of a user's finger.

The tactile screen can also comprise imprints corresponding to "routine cursors" 9 which allow the user to choose, validate, and also place the writing cursor at the location selected by the user by moving his finger over a screen of this type.

In accordance with a preferred embodiment of the present invention the routine cursors 9 are situated in a linear imprint, thus in the form of a channel, which is situated on a side of the tactile screen 2. Generally, said screen comprises two linear imprints situated on two opposite sides of the screen.

As will also be known by a person skilled in the art, the tactile screen 2, more especially in this last embodiment, can cover the entire surface of the device.

As mentioned previously, the invention also relates to a display for visually impaired people comprising a device as described above.

The invention claimed is:

1. A device comprising
a tactile screen, for a display for visually impaired people, spaced-apart means for determining a position of fingers of right and left hands of a user, said tactile screen including imprints corresponding to said fingers.

2. The device according to claim 1, wherein the tactile screen includes, along one of edges thereof, a line of icons each corresponding to a piece of software.

3. The device according to claim 2, wherein the tactile screen is divided at least into as many columns as icons, and said device further comprises means for determining the position of the user's finger imprints of the tactile screen.

4. The device according to claim 2, wherein the tactile screen includes a next column in order to scroll through the icons.

5. The device according to claim 2, wherein the tactile screen includes a previous column in order to scroll through the icons.

6. The device according to claim 4, further comprising a voice emitter to identify each icon determined by the position of the user's finger.

7. The device according to claim 4, further comprising a braille display to identify each icon determined by the position of the user's finger.

8. The device according to claim 2, wherein the tactile screen is gridded at least in a zone of the imprints.

9. The device according to claim 1, wherein the tactile screen includes imprints corresponding to routine cursors.

10. A display for visually impaired people comprising the device according to claim 1.

* * * * *